(12) United States Patent
Tai et al.

(10) Patent No.: US 11,415,838 B2
(45) Date of Patent: Aug. 16, 2022

(54) DISPLAY DEVICE

(71) Applicant: Innolux Corporation, Miao-Li County (TW)

(72) Inventors: Ming-Jou Tai, Miao-Li County (TW); Chia-Hao Tsai, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/079,529

(22) Filed: Oct. 26, 2020

(65) Prior Publication Data

US 2021/0132427 A1    May 6, 2021

Related U.S. Application Data

(60) Provisional application No. 62/931,225, filed on Nov. 6, 2019.

(30) Foreign Application Priority Data

Sep. 9, 2020    (CN) .......................... 202010940822.3

(51) Int. Cl.
*G02F 1/1339* (2006.01)
*G02F 1/1362* (2006.01)
*G02F 1/1343* (2006.01)

(52) U.S. Cl.
CPC .... *G02F 1/13394* (2013.01); *G02F 1/134309* (2013.01); *G02F 1/136227* (2013.01); *G02F 1/136286* (2013.01); *G02F 2201/123* (2013.01)

(58) Field of Classification Search
CPC ......... G02F 2201/123; G02F 1/136286; G02F 1/136227; G02F 1/134309; G02F 1/1339; G02F 1/0107; G02F 2001/13396; G02F 1/13396; H01J 9/242; H01J 11/36; H01J 2211/36; H01J 2217/49271
See application file for complete search history.

(56) References Cited

U.S. PATENT DOCUMENTS

| | | | |
|---|---|---|---|
| 2009/0273747 A1* | 11/2009 | Shin | G02F 1/13394 349/107 |
| 2013/0021552 A1* | 1/2013 | Tomioka | G02F 1/136227 349/43 |
| 2013/0342781 A1* | 12/2013 | Lee | G02F 1/13394 349/46 |
| 2016/0274403 A1* | 9/2016 | Araki | G02F 1/133512 |
| 2017/0045773 A1* | 2/2017 | Seo | G02F 1/136209 |
| 2017/0146844 A1* | 5/2017 | Yang | G02F 1/13624 |
| 2018/0039120 A1* | 2/2018 | Saitoh | G02F 1/133514 |
| 2019/0196242 A1* | 6/2019 | Nomura | H01L 27/124 |
| 2019/0339555 A1* | 11/2019 | Yoshida | G02F 1/13394 |

* cited by examiner

*Primary Examiner* — Mariam Qureshi
(74) *Attorney, Agent, or Firm* — JCIPRNET

(57) ABSTRACT

A display device is provided. The display device includes a first substrate, a first drain, a planarization layer, a first pixel electrode, a second substrate, and a spacer. The first drain is disposed on the first substrate. The planarization layer is disposed on the first drain and has a first contact hole exposing the first drain. The first pixel electrode is disposed on the planarization layer and is electrically connected to the first drain via the first contact hole. The second substrate is disposed opposite to the first substrate. The spacer is disposed between the planarization layer and the second substrate. The spacer at least partially overlaps with the first contact hole.

13 Claims, 6 Drawing Sheets

DISPLAY DEVICE

CROSS-REFERENCE TO RELATED APPLICATION

This application claims the priority benefit of U.S. provisional application Ser. No. 62/931,225, filed on Nov. 6, 2019 and China application serial no. 202010940822.3, filed on Sep. 9, 2020. The entirety of each of the above-mentioned patent applications is hereby incorporated by reference herein and made a part of this specification.

BACKGROUND

Technical Field

The disclosure relates to a display device, and more particularly, to a display device having a spacer.

Description of Related Art

In conventional display devices, spacers are used to maintain the cell gap between two substrates of a panel, and a light barrier layer (e.g., black matrix) are used to shield the spacers and other metal wires. The use of dot-shaped spacers to maintain the cell gap may result in an issue of insufficient support. In addition, the dot-shaped spacers need to be shielded by dot-shaped light shielding patterns, but dot-shaped light shielding patterns have different shielding ratios with respect to multiple adjacent pixel regions and may cause the brightness of these pixel regions to be not uniform. Moreover, when the display device is applied to virtual reality, a user may easily observe black points in the enlarged virtual image corresponding to the dot-shaped light shielding patterns.

SUMMARY

According to an embodiment of the disclosure, a display device includes a first substrate, a first drain, a planarization layer, a first pixel electrode, a second substrate, and a spacer. The first drain is disposed on the first substrate. The planarization layer is disposed on the first drain and has a first contact hole exposing the first drain. The first pixel electrode is disposed on the planarization layer and is electrically connected to the first drain via the first contact hole. The second substrate is disposed opposite to the first substrate. The spacer is disposed between the planarization layer and the second substrate. The spacer at least partially overlaps with the first contact hole.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
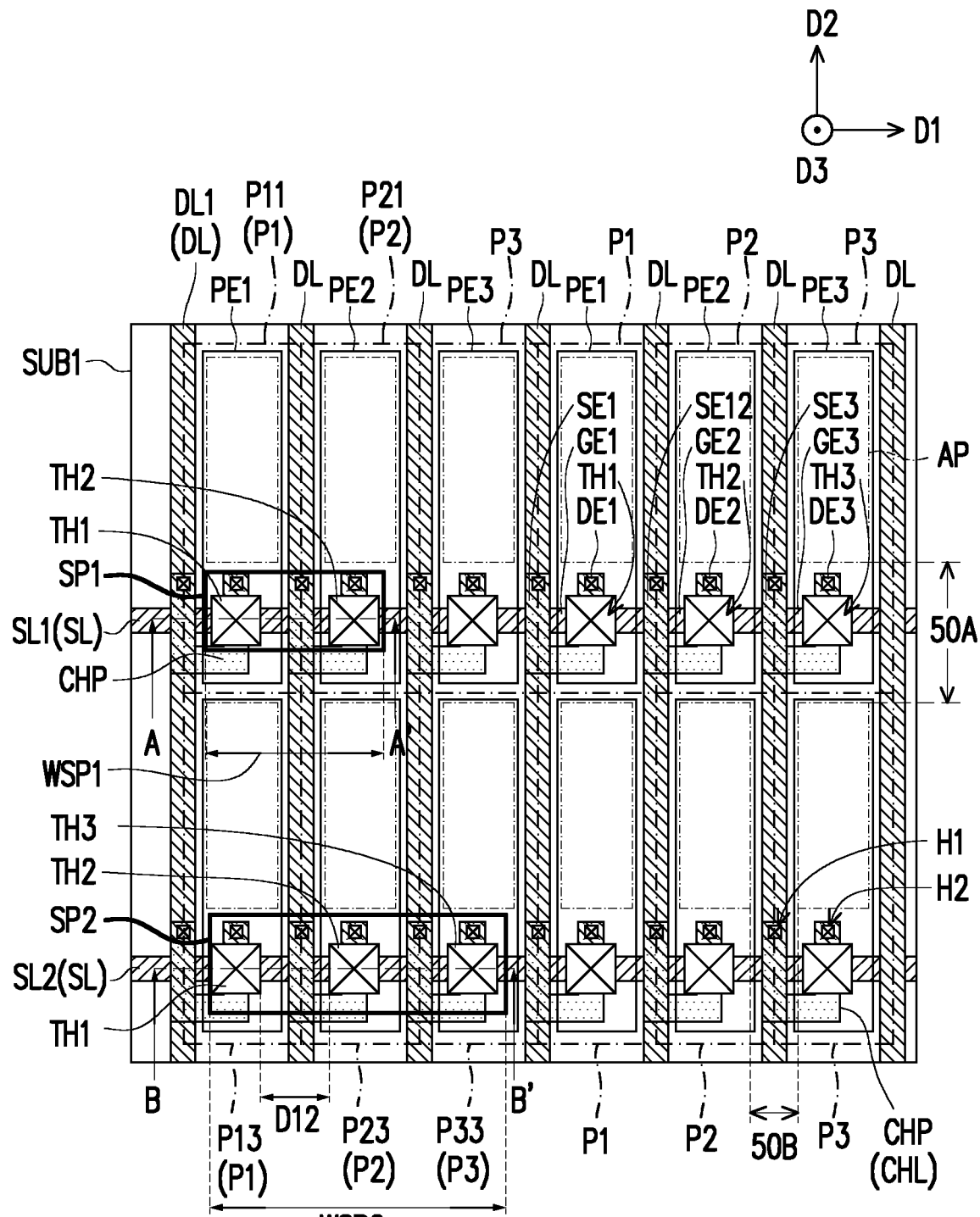
FIG. 1 is a schematic partial top view of a display device according to a first embodiment of the disclosure.

The disclosure may be understood by referring to the following detailed description with reference to the accompanying drawings. It is noted that for comprehension of the reader and simplicity of the drawings, in the drawings of the disclosure, only a part of the electronic device/display device is shown, and specific components in the drawings are not necessarily drawn to scale. Moreover, the quantity and the size of each component in the drawings are only schematic and are not intended to limit the scope of the disclosure. For example, for clarity, relative sizes, thicknesses, and locations of film layers, regions, or structures may be reduced or enlarged.

Throughout the specification and the appended claims of the disclosure, certain terms are used to refer to specific components. Those skilled in the art should understand that electronic device manufacturers may probably use different names to refer to the same components. This specification is not intended to distinguish between components that have the same function but different names. In the following specification and claims, the terms "having", "including", etc., are open-ended terms, so they should be interpreted to mean "including but not limited to . . . ".

Directional terminology mentioned herein, such as "top", "bottom", "front", "back", "left", "right", etc., is used with reference to the orientation of the drawings. Therefore, the used directional terminology is only intended to illustrate, rather than limit, the disclosure. It should be understood that when a component or a film layer is described as being "on" or "connected to" another component or film layer, it may be directly on or connected to the another component or film layer, or there is an intervening component or film layer therebetween (i.e., indirect connection). Conversely, when a component or film layer is described as being "directly on" or "directly connected to" another component or film layer, there is no intervening component or film layer therebetween.

The terms such as "about", "equal", "same", "identical", "substantially", or "approximately" are generally interpreted as being within a range of plus or minus 10% of a given value or range, or as being within a range of plus or minus 5%, plus or minus 3%, plus or minus 2%, plus or minus 1%, or plus or minus 0.5% of the given value or range. In addition, expressions "a given range is a first numerical value to a second numerical value" and "a given range falls within a range from a first numerical value to a second numerical value" mean that the given range includes the first numerical value, the second numerical value, and other values therebetween.

In some embodiments of the disclosure, unless specifically defined, terms related to bonding and connection such as "connect", "interconnect", etc. may mean that two structures are in direct contact, or that two structures are not in direct contact and another structure is provided therebetween. The terms related to bonding and connection may also cover cases where two structures are both movable or two structures are both fixed. In addition, the terms "electrically connect" and "couple" include any direct and indirect electrical connection means.

In the following embodiments, the same or similar components will be labeled with the same or similar reference numerals, and repeated descriptions thereof will be omitted. In addition, the features in different embodiments may be mixed and combined arbitrarily as long as they do not violate the spirit of the disclosure or result in conflict. Simple equivalent changes and modifications made in accordance with this specification or claims still fall within the scope of the disclosure. Furthermore, the terms "first", "second", etc. mentioned in the specification or claims are only used to designate names of components or distinguish among different embodiments or scopes and are not meant to designate upper or lower limits of numbers of components, and are not meant to limit the manufacturing sequence or arrangement sequence of components.

In the disclosure, the electronic device may include a display device, an antenna device, a sensing device, a light-emitting device, or a splicing device, but is not limited thereto. The electronic device may include a bendable or flexible electronic device. The electronic device may include, for example, a liquid crystal layer or a light-emitting diode (LED). The light-emitting diode may include, for example, an organic light-emitting diode (OLED), a mini LED, a micro LED or a quantum dot LED (which may include QLED and QDLED), a fluorescence, a phosphor, other suitable materials, or a combination of the above, but is not limited thereto. Hereinafter, a display device will be described as the electronic device to illustrate the content of the disclosure, but the disclosure is not limited thereto.

The display device of the disclosure may include any type of display device, such as a self-luminous display device or a non-self-luminous display device. The self-luminous display device may include a light-emitting diode, a light conversion layer, other suitable materials, or a combination of the above, but is not limited thereto. The light-emitting diode may include, for example, an organic light-emitting diode (OLED), a mini LED, a micro LED, or a quantum dot LED (which may include QLED and QDLED), but is not limited thereto. The light conversion layer may include a wavelength conversion material and/or a light filter material, and the light conversion layer may include, for example, a fluorescence, a phosphor, a quantum dot (QD), other suitable materials, or a combination of the above, but is not limited thereto. The non-self-luminous display device may include a liquid crystal display device but is not limited thereto. Hereinafter, a liquid crystal display device will be described as the display device to illustrate the content of the disclosure, but the disclosure is not limited thereto.

Figure 2:
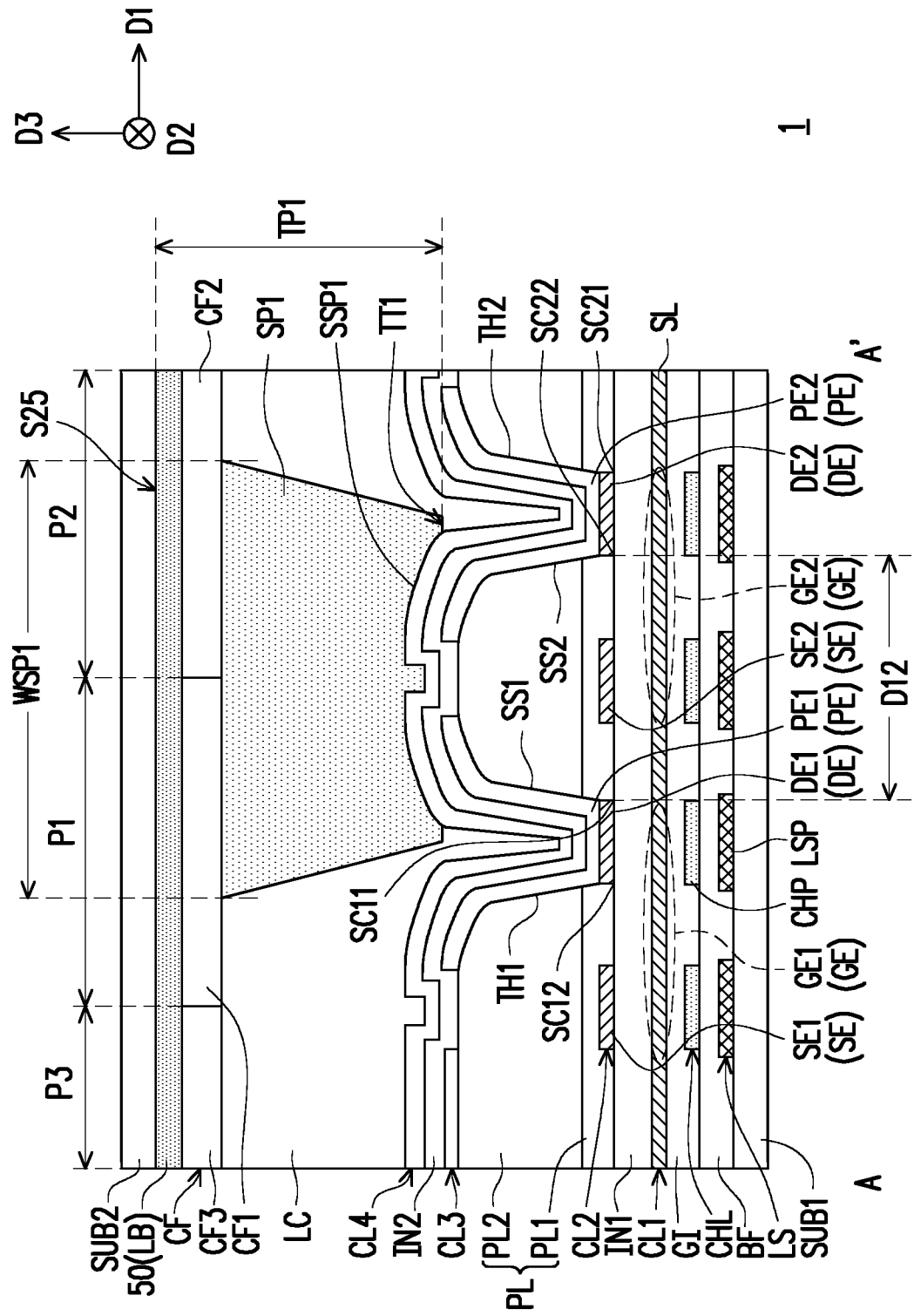
FIG. 2 and FIG. 3 are respectively first schematic cross-sectional views taken along section line A-A' and section line B-B' in FIG. 1.
Figure 3:
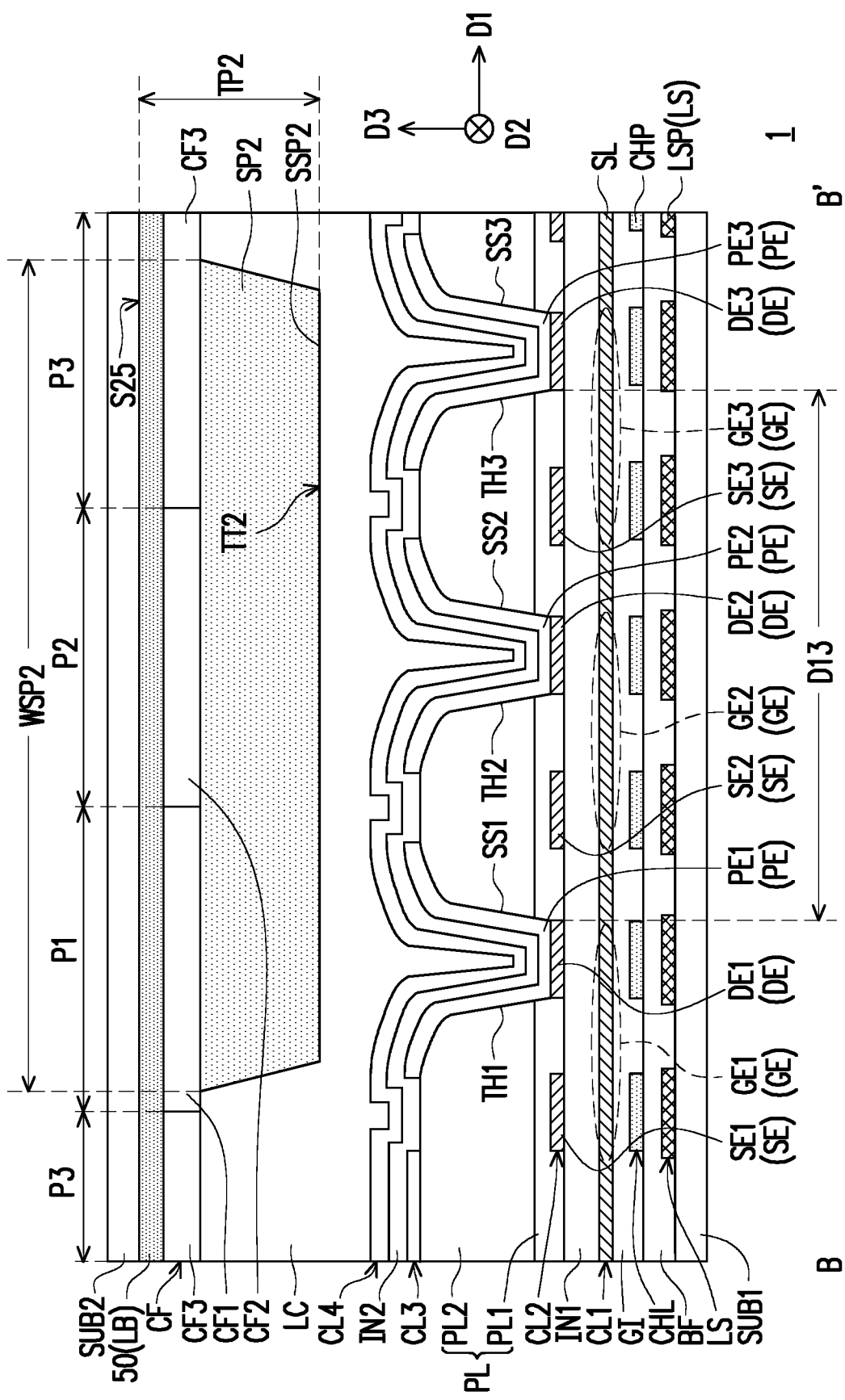

FIG. 1 is a schematic partial top view of a display device according to a first embodiment of the disclosure. FIG. 2 and FIG. 3 are respectively first schematic cross-sectional views taken along section line A-A' and section line B-B' in FIG. 1. For clarity, some layers of the display device are not shown in FIG. 1, and reference may be made to FIG. 2 and FIG. 3 for the relative arrangement relationships of these layers.

Referring to FIG. 1 first, a display device 1 has a first pixel region P1. According to different requirements, the display device 1 may further have a second pixel region P2 and a third pixel region P3. The first pixel region P1, the second pixel region P2, and the third pixel region P3 may be, for example, pixel regions of different colors, and in FIG. 1, thick dot-dash lines mark the boundaries of multiple pixel regions. For example, the first pixel region P1, the second pixel region P2, and the third pixel region P3 are respectively a blue pixel region, a red pixel region, and a green pixel region. The second pixel region P2 is adjacent to the first pixel region P1 in a first direction D1, and the third pixel region P3 is adjacent to the second pixel region P2 in the first direction D1. In some embodiments, the first pixel region P1, the second pixel region P2, and the third pixel region P3 may be alternately arranged in the first direction D1, and multiple pixel regions of the same color may be arranged in a second direction D2. The second direction D2 intersects with the first direction D1, and the second direction D2 is, for example, perpendicular to the first direction D1. However, the types and numbers of colors or arrangement of the pixel regions in the display device 1 may be changed according to the requirements.

Referring to FIG. 1 to FIG. 3, the display device 1 may include a first substrate SUB1, a light shielding layer LS, a buffer layer BF, a semiconductor layer CHL, a gate insulating layer GI, a first conductive layer CL1, an insulating layer IN1, a second conductive layer CL2, a planarization layer PL, a third conductive layer CL3, an insulating layer IN2, a fourth conductive layer CL4, a liquid crystal layer LC, a color filter layer CF, a light barrier layer LB, a second substrate SUB2, and a plurality of spacers (e.g. a spacer SP1 and a spacer SP2). However, the types or numbers of the components or layers in the display device 1 may be increased or decreased according to the requirements.

The first substrate SUB1 may be configured to carry components. The first substrate SUB1 may be bendable, flexible, or rigid. The first substrate SUB1 may be curved, flat, or a combination of the above. For example, the first substrate SUB1 may include a glass substrate, a plastic substrate, a resin substrate, or a combination of at least two of the above, but is not limited thereto.

The light shielding layer LS is disposed on the first substrate SUB1. The light shielding layer LS may be configured to shield light from a backlight source (not shown) to reduce the interference with a photosensitive material layer (e.g., the semiconductor layer CHL) in the display device 1 caused by the light from the backlight source (not shown). For example, the material of the light shielding layer LS may include a light-absorbing material, a light-reflecting material, or a combination of the above, but is not limited thereto. The light shielding layer LS may include a plurality of patterns LSP. The plurality of patterns LSP overlap with the patterns (e.g., semiconductor patterns CHP) of the photosensitive material layer in the thickness direction (e.g., a third direction D3) of the display device 1, and the size of the pattern LSP may be slightly greater than the size of the pattern of the overlapped photosensitive material layer, so as to effectively reduce the negative influence on the pattern of the photosensitive material layer caused by the light from the backlight source.

The buffer layer BF is disposed on the light shielding layer LS and the first substrate SUB1. The buffer layer BF may be configured to reduce the contamination to the semiconductor layer CHL from impurities in the first substrate SUB1. For example, the material of the buffer layer BF may include silicon dioxide, silicon nitride, a photoresist material, or a combination of at least two of the above, but is not limited thereto.

The semiconductor layer CHL is disposed on the buffer layer BF and includes a plurality of semiconductor patterns CHP. According to different requirements, the material of the semiconductor layer CHL may include a photosensitive material or a non-photosensitive material. For example, the material of the semiconductor layer CHL may include amorphous silicon, polysilicon, or metal oxide, but is not limited thereto. For example, the material of the semiconductor layer CHL may be low temperature polysilicon (LTPS). In some embodiments, when a non-photosensitive material is included to manufacture the semiconductor layer CHL, the light shielding layer LS may be omitted.

The gate insulating layer GI is disposed on the semiconductor layer CHL and the buffer layer BF. For example, the material of the gate insulating layer GI may include silicon dioxide, silicon nitride, or a combination of the two, but is not limited thereto.

The first conductive layer CL1 is disposed on the gate insulating layer GI. As shown in FIG. 1, the first conductive layer CL1 may include a plurality of gates GE and a plurality of scan lines SL (e.g., a first scan line SL1 and a second scan line SL2) electrically connected to the plurality of gates GE, but is not limited thereto. The plurality of gates GE may include a first gate GE1 disposed on the first substrate SUB1 and disposed in the first pixel region P1, a second gate GE2 disposed on the first substrate SUB1 and disposed in the second pixel region P2, and a third gate GE3 disposed on the first substrate SUB1 and disposed in the third pixel region P3, but is not limited thereto. The plurality of scan lines SL are disposed on the first substrate SUB1, extend along the first direction D1, and are arranged along the second direction D2. Based on the consideration of the signal transmission, the material of the first conductive layer CL1 may be a low-impedance or high-conductivity material, such as a metal, an alloy, or a combination of the two, but is not limited thereto.

The insulating layer IN1 is disposed on the first conductive layer CL1 (including the plurality of gate GE and the plurality of scan line SL) and the gate insulating layer GI. For example, the material of the insulating layer IN1 may include silicon dioxide, silicon nitride, or a combination of the two, but is not limited thereto.

The second conductive layer CL2 is disposed on the insulating layer IN1. The second conductive layer CL2 may include a plurality of sources SE, a plurality of drains DE, and a plurality of data lines DL, but is not limited thereto. The plurality of sources SE may include a first source SE1 disposed on the first substrate SUB1 and disposed in the first pixel region P1, a second source SE2 disposed on the first substrate SUB1 and disposed in the second pixel region P2, and a third source SE3 disposed on the first substrate SUB1 and disposed in the third pixel region P3, but is not limited thereto. The plurality of drains DE may include a first drain DE1 disposed on the first substrate SUB1 and disposed in the first pixel region P1, a second drain DE2 disposed on the first substrate SUB1 and disposed in the second pixel region P2, and a third drain DE3 disposed on the first substrate SUB1 and disposed in the third pixel region P3, but is not limited thereto. The plurality of data lines DL are disposed on the first substrate SUB1, extend along the second direction D2, and are arranged along the first direction D1. Based on the consideration of the signal transmission, the material of the second conductive layer CL2 may be a low-impedance or high-conductivity material, such as a metal, an alloy, or a combination of the two, but is not limited thereto. In some embodiments, each source SE may be formed by a part of the corresponding data line DL. In some embodiments, the material of the semiconductor layer CHL may include polysilicon, and each source SE may be connected to the source region in a corresponding semiconductor pattern CHP via a first opening H1 (see FIG. 1). Similarly, each drain DE may be connected to the drain region in a corresponding semiconductor pattern CHP via a second opening H2 (see FIG. 1).

In a pixel region, a semiconductor pattern CHP, a gate GE, a source SE, and a drain DE may be disposed to form a transistor. Taking the first pixel region P1 and the first scan line SL1 as an example, specifically, the scan line SL1 may form a plurality of gates GE. According to some embodiments, in the first pixel region P1, the part of the first scan line SL1 overlapping with the semiconductor pattern CHP may form a first gate GE1. The plurality of sources SE may include a first source SE1 disposed on the first substrate SUB1 and disposed in the first pixel region P1. For example, a part of the data line DL1 may form the first source SE1 disposed in the first pixel region P1. The plurality of drains DE may include a first drain DE1 disposed on the first substrate SUB1 and disposed in the first pixel region P1. The semiconductor pattern CHP, the first gate GE1, the first source SE1, and the first drain DE1 may form a transistor. The semiconductor pattern CHP may be U-shaped but is not limited thereto. The insulating layer IN1 may have a first opening H1 and a second opening H2, and the first opening H1 and the second opening H2 may pass through the insulating layer IN1 and the gate insulating layer GI. The source SE1 may be connected to the source region in the corresponding semiconductor pattern CHP via the first opening H1. The drain DE1 may be connected to the drain region in the corresponding semiconductor pattern CHP via the second opening H2.

The planarization layer PL is disposed on the second conductive layer CL2 (including a plurality of sources SE, a plurality of drains DE, and a plurality of data lines DL) and the insulating layer IN1. For example, the material of the planarization layer PL may include an organic material, an inorganic material, or a combination of the two, but is not limited thereto. FIG. 2 and FIG. 3 schematically show that the planarization layer PL may include an inorganic material layer PL1 and an organic material layer PL2, but the disclosure is not limited thereto. The planarization layer PL has a first contact hole TH1 exposing the first drain DE1, a second contact hole TH2 exposing the second drain DE2, and a third contact hole TH3 exposing the third drain DE3, but is not limited thereto.

The third conductive layer CL3 may be disposed on the planarization layer PL. The third conductive layer CL3 may include a plurality of pixel electrodes PE. Specifically, the third conductive layer CL3 may include a first pixel electrode PE1 disposed on the planarization layer PL and electrically connected to the first drain DE1 via the first contact hole TH1, a second pixel electrode PE2 disposed on the planarization layer PL and electrically connected to the second drain DE2 via the second contact hole TH2, and a third pixel electrode PE3 disposed on the planarization layer PL and electrically connected to the third drain DE3 via the third contact hole TH3, but is not limited thereto. Based on the consideration of the aperture ratio, the material of the third conductive layer CL3 may be a material having high light transmittance, such as a metal oxide, a metal mesh, or a combination of the two, but is not limited thereto. In some embodiments, the range of the pixel region may be defined by the pixel electrode PE. As shown in FIG. 1, the boundary between the first pixel region P1 and the second pixel region P2 which are adjacent in the first direction D1 is, for example, disposed between the first pixel electrode PE1 of the first pixel region P1 and the second pixel electrode PE2 of the second pixel region P2, the boundary between the second pixel region P2 and the third pixel region P3 which are adjacent in the first direction D1 is, for example, disposed between the second pixel electrode PE2 of the second pixel region P2 and the third pixel electrode PE3 of the third pixel region P3, and the boundary between the third pixel region P3 and the first pixel region P1 which are adjacent in the first direction D1 is, for example, disposed between the third pixel electrode PE3 of the third pixel region P3 and the first pixel electrode PE1 of the first pixel region P1. In addition, the boundary between two first pixel regions P1 adjacent in the second direction D2 is, for example, disposed between the two first pixel electrodes PE1 of the two adjacent first pixel regions P1, the boundary between two second pixel regions P2 adjacent in the second direction D2 is, for example, disposed between the two second pixel electrodes PE2 of the two adjacent second pixel regions P2, and the boundary between two third pixel regions P3 adjacent in the second direction D2 is, for example, disposed between the two third pixel electrodes PE3 of the two adjacent third pixel regions P3.

The insulating layer IN2 is disposed on the third conductive layer CL3 (including the first pixel electrode PE1, the second pixel electrode PE2, and the third pixel electrode PE3). For example, the material of the insulating layer IN2 may include silicon dioxide, silicon nitride, or a combination of the two, but is not limited thereto.

The fourth conductive layer CL4 is disposed on the insulating layer IN2. The fourth conductive layer CL4 may be a continuous conductive film. For example, the fourth conductive layer CL4 may be a common electrode layer. Based on the consideration of the aperture ratio, the material of the fourth conductive layer CL4 may be a material having high light transmittance, such as a metal oxide, a metal mesh, or a combination of the two, but is not limited thereto.

In other pixel regions, a semiconductor pattern CHP, a gate GE, a source SE, a drain DE, a pixel electrode, a contact hole etc. may also be disposed. For example, in the second pixel region P2, a semiconductor pattern CHP, a second gate GE2, a second source SE2, and a second drain DE2 may also be disposed on the first substrate SUB1 to form a transistor. The second pixel electrode PE2 may be electrically connected to the second drain DE2 in the second pixel region P2 via a second contact hole TH2. Reference may be made to the same design in the first pixel region P1 for descriptions of the design of the transistor, the pixel electrode, and the contact hole in other pixel regions, which shall not be repeated herein.

The second substrate SUB2 is disposed opposite to the first substrate SUB1, and the light shielding layer LS, the buffer layer BF, the semiconductor layer CHL, the gate insulating layer GI, the first conductive layer CL1, the insulating layer IN1, the second conductive layer CL2, the planarization layer PL, the third conductive layer CL3, the insulating layer IN2, the fourth conductive layer CL4, the liquid crystal layer LC, the color filter layer CF, the light barrier layer LB, and the plurality of spacers (e.g., the spacer SP1 and the spacer SP2) are disposed between the first substrate SUB1 and the second substrate SUB2.

The second substrate SUB2 may be configured to carry components. The second substrate SUB2 may be bendable, flexible, or rigid. The second substrate SUB2 may be curved, flat, or a combination of the above. For example, the second substrate SUB2 may include a glass substrate, a plastic substrate, a resin substrate, or a combination of at least two of the above, but is not limited thereto.

The light barrier layer LB is disposed on the second substrate SUB2 and faces the liquid crystal layer LC, and the light barrier layer LB is disposed between a spacer (e.g., the spacer SP1 or the spacer SP2) and the second substrate SUB2. The light barrier layer LB may be configured to shield components in the display device 1 that are not desired to be seen. For example, the light barrier layer LB may be a black matrix. Specifically, the light barrier layer LB may include a barrier portion 50 and a plurality of apertures AP other than the barrier portion 50. To simplify the drawing, the barrier portion 50 is not shown in FIG. 1, and thin dot-dash lines in FIG. 1 mark the boundaries of the plurality of apertures AP. The plurality of apertures AP are arranged in the first direction D1 and the second direction D2. The width of the barrier portion 50 in the second direction D2 is a first width 50A of the barrier portion 50. The width of the barrier portion 50 in the first direction D1 is a second width 50B of the barrier portion 50. The barrier portion 50 of the light barrier layer LB may shield elements on the first substrate SUB1, for example, shielding the plurality of data lines DL, the plurality of scan lines SL, and the plurality of transistors.

The color filter layer CF is disposed on the light barrier layer LB and faces the liquid crystal layer LC. For example, the color filter layer CF may include a first filter pattern CF1 disposed in the first pixel region P1, a second filter pattern CF2 disposed in the second pixel region P2, and a third filter pattern CF3 disposed in the third pixel region P3, and the first filter pattern CF1, the second filter pattern CF2, and the third filter pattern CF3 are respectively a blue filter pattern which allows blue light to pass through and absorbs the remaining color light, a red filter pattern which allows red light to pass through and absorbs the remaining color light, and a green filter pattern which allows green light to pass through and absorbs the remaining color light, but the disclosure is not limited thereto.

The display device 1 may include a spacer SP, and the spacer SP is disposed between the first substrate SUB1 and the second substrate SUB2. Specifically, the spacer (e.g., a spacer SP1 or a spacer SP2) may be disposed between the planarization layer PL and the second substrate SUB2. FIG. 1 and FIG. 2 schematically show a spacer SP1, and the spacer SP1 may serve as a main spacer and is supported between the fourth conductive layer CL4 and the color filter layer CF to maintain the cell gap between the fourth conductive layer CL4 and the color filter layer CF. FIG. 1 and FIG. 3 schematically show a spacer SP2, and the spacer SP2 may serve as a sub spacer and is disposed on one of the fourth conductive layer CL4 and the color filter layer CF. When the display device 1 is pressed by an external force, the spacer SP2 abuts against another of the fourth conductive layer CL4 and the color filter layer CF, and when the external force is removed, the spacer SP2 is separated from the another of the fourth conductive layer CL4 and the color filter layer CF. The respective numbers of the spacer SP1 and the spacer SP2 may be increased or decreased according to the requirements and are not specifically limited herein. According to some embodiments, the display device may include the spacer SP1 but not the spacer SP2. According to some embodiments, the display device may include the spacer SP2 but not the spacer SP1. According to some embodiments, the display device may include the spacer SP1 and the spacer SP2.

In some embodiments, as shown in FIG. 2 and FIG. 3, the spacer SP1 and the spacer SP2 may be disposed on the second substrate SUB2 and face the planarization layer PL. Under this architecture, a first surface SSP1 of the main spacer (e.g., the spacer SP1) facing the fourth conductive layer CL4 may undulate along with the topography of the fourth conductive layer CL4. On the other hand, a second surface SSP2 of the sub spacer (e.g., the spacer SP2) facing the fourth conductive layer CL4 may be separated from the fourth conductive layer CL4 by a distance.

As shown in FIG. 1 and FIG. 2, in the first direction D1, the first pixel region P1 (e.g., a first pixel region P11) and the second pixel region P2 (e.g., a second pixel region P21) are disposed adjacent to each other. In other words, the pixel electrode (the first pixel electrode PE1) disposed in the first pixel region P11 and the pixel electrode (the second pixel electrode PE2) disposed in the second pixel region P21 are also disposed adjacent to each other. Reference may be made to the same design in the first pixel region P1 for descriptions of the design of the transistor, the pixel electrode, and the contact hole in the pixel regions, which shall not be repeated herein. In the first pixel region P11, the pixel electrode PE1 may be electrically connected to the first drain DE1 via the first contact hole TH1. In the second pixel region P21, the pixel electrode PE2 may be electrically connected to the second drain DE2 via the second contact hole TH2. The spacer (e.g., the spacer SP1 or the spacer SP2) may at least partially overlap with the first contact hole TH1. As shown in FIG. 2, the spacer SP1 may overlap with at least one sidewall surface SS1 of the first contact hole TH1 in the third direction D3, but is not limited thereto. In some embodiments, the spacer (e.g., the spacer SP1 or the spacer SP2) may also partially overlap with the second contact hole TH2. As shown in FIG. 2, the spacer SP1 may also overlap with at least one sidewall surface SS2 of the second contact hole TH2 in the third direction D3, but is not limited thereto. In some embodiments, as shown in FIG. 1, the spacer (e.g., the spacer SP1 or the spacer SP2) may at least partially overlap with one of the scan lines SL.

In some embodiments, as shown in FIG. 1 and FIG. 2, in the first direction D1, a width WSP1 of the spacer SP1 may be greater than a distance D12 between the first contact hole TH1 and the second contact hole TH2. According to some embodiments, the width WSP1 of the spacer SP1 may be a width of a projection on the first substrate SUB1. The distance D12 between the first contact hole TH1 and the second contact hole TH2 may be a width of projections of the first contact hole TH1 and the second contact hole TH2 on the first substrate SUB1. Specifically, the distance D12 between the first contact hole TH1 and the second contact hole TH2 may be measured based on the projections of the first contact hole TH1 and the second contact hole TH2 on the first substrate SUB1. For example, after projection, the bottoms of the first contact hole TH1 and the second contact hole TH2 may be seen. The bottom of the first contact hole TH1 has an outer side SC12 and an inner side SC11, and the inner side SC11 represents the side closer to the second contact hole TH2. The bottom of the second contact hole TH2 has an outer side SC21 and an inner side SC22, and the inner side SC22 represents the side closer to the first contact hole TH1. According to some embodiments, the distance D12 between the inner side SC11 of the bottom of the first contact hole TH1 and the inner side SC22 of the bottom of the second contact hole TH2 may be measured. According to other embodiments, in the first direction D1, the width WSP1 of the spacer SP1 may be less than the distance D12 between the first contact hole TH1 and the second contact hole TH2. According to some embodiments, although not shown in the drawings, the spacer may at least partially overlap with the first contact hole TH1 but does not overlap with the second contact hole TH2. In that case, in the first direction D1, the width WSP1 of the spacer may be less than the distance between the first contact hole TH1 and the second contact hole TH2.

As shown in FIG. 1 and FIG. 3, in the first direction D1, a pixel region P13, a pixel region P23, and a pixel region P33 are disposed adjacent to each other. In other words, the pixel electrode (the first pixel electrode PE1) disposed in the pixel region P13, the pixel electrode (the second pixel electrode PE2) disposed in the pixel region P23, and the pixel electrode (the third pixel electrode PE3) disposed in the pixel region P33 are disposed adjacent to each other. Specifically, the second pixel electrode PE2 is disposed between the first pixel electrode PE1 and the third pixel electrode PE3 and is disposed adjacent to the first pixel electrode PE1 and the third pixel electrode PE3. Reference may be made to the same design in the first pixel region P1 for descriptions of the design of the transistor, the pixel electrode, and the contact hole in the pixel regions, which shall not be repeated herein. In the pixel region P13, the first pixel electrode PE1 may be electrically connected to the first drain DE1 via the first contact hole TH1. In the pixel region P23, the second pixel electrode PE2 may be electrically connected to the second drain DE2 via the second contact hole TH2. In the pixel region P33, the third pixel electrode PE3 may be electrically connected to the third drain DE3 via the third contact hole TH3.

As shown in FIG. 3, the spacer SP2 may overlap with the two sidewall surfaces SS1 of the first contact hole TH1, the two sidewall surfaces SS2 of the second contact hole TH2, and the two sidewall surfaces SS3 of the third contact hole TH3 in the third direction D3, but is not limited thereto. In the first direction D1, a width WSP2 of the spacer SP2 may be greater than the distance D12 (labeled in FIG. 2) between the first contact hole TH1 and the second contact hole TH2. Furthermore, in the first direction D1, the width WSP2 of the spacer SP2 may be greater than a distance D13 between the first contact hole TH1 and the third contact hole TH3.

In some embodiments, as shown in FIG. 1, the spacer (e.g., the spacer SP1 or the spacer SP2) may be disposed between two adjacent apertures AP arranged in the second direction D2. In addition, the shape of an orthographic projection of the spacer (e.g., the spacer SP1 and the spacer SP2) on the first substrate SUB1 may be rectangular, but is not limited thereto. According to some embodiments, the shape of the spacer may be square or other shapes. According to some embodiments, the shape of the spacer may include a circular shape or may include an arc shape.

According to some embodiments, by designing the spacer and the contact hole to at least partially overlap with each other, the contact area between the spacer and other components or layers (e.g., the fourth conductive layer CL4) can be increased, thereby improving the supportability of the spacer. In addition, increasing the overlap area between the spacer and the contact hole or designing the spacer as a rectangular spacer also helps to improve the supportability of the spacer. Moreover, under the architecture where the spacer is a rectangular spacer, the light barrier layer LB may have the same or similar shielding ratio with respect to multiple adjacent pixel regions (e.g., the first pixel region P1, the second pixel region P2, and the third pixel region P3), and as a result, the brightness of these pixel regions can be more uniform. Furthermore, under the architecture where the spacer is a rectangular spacer, since the light barrier layer LB does not need to include dot-shaped light shielding patterns, when the display device 1 is applied to virtual reality, the issue of occurrence of black points in the image corresponding to the dot-shaped light shielding patterns can be improved.

Figure 4:
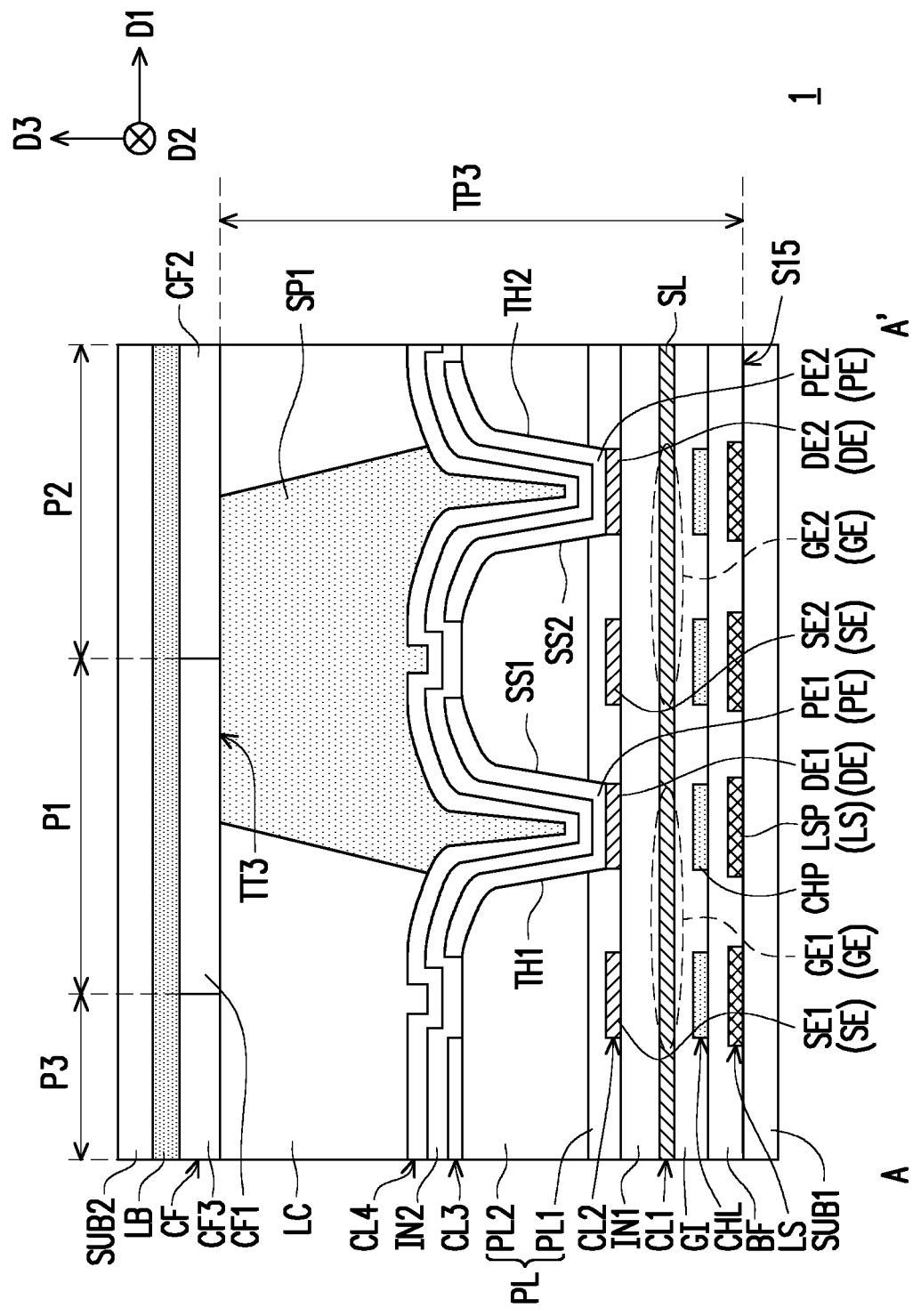
FIG. 4 and FIG. 5 are respectively second schematic cross-sectional views taken along section line A-A' and section line B-B' in FIG. 1.
Figure 5:
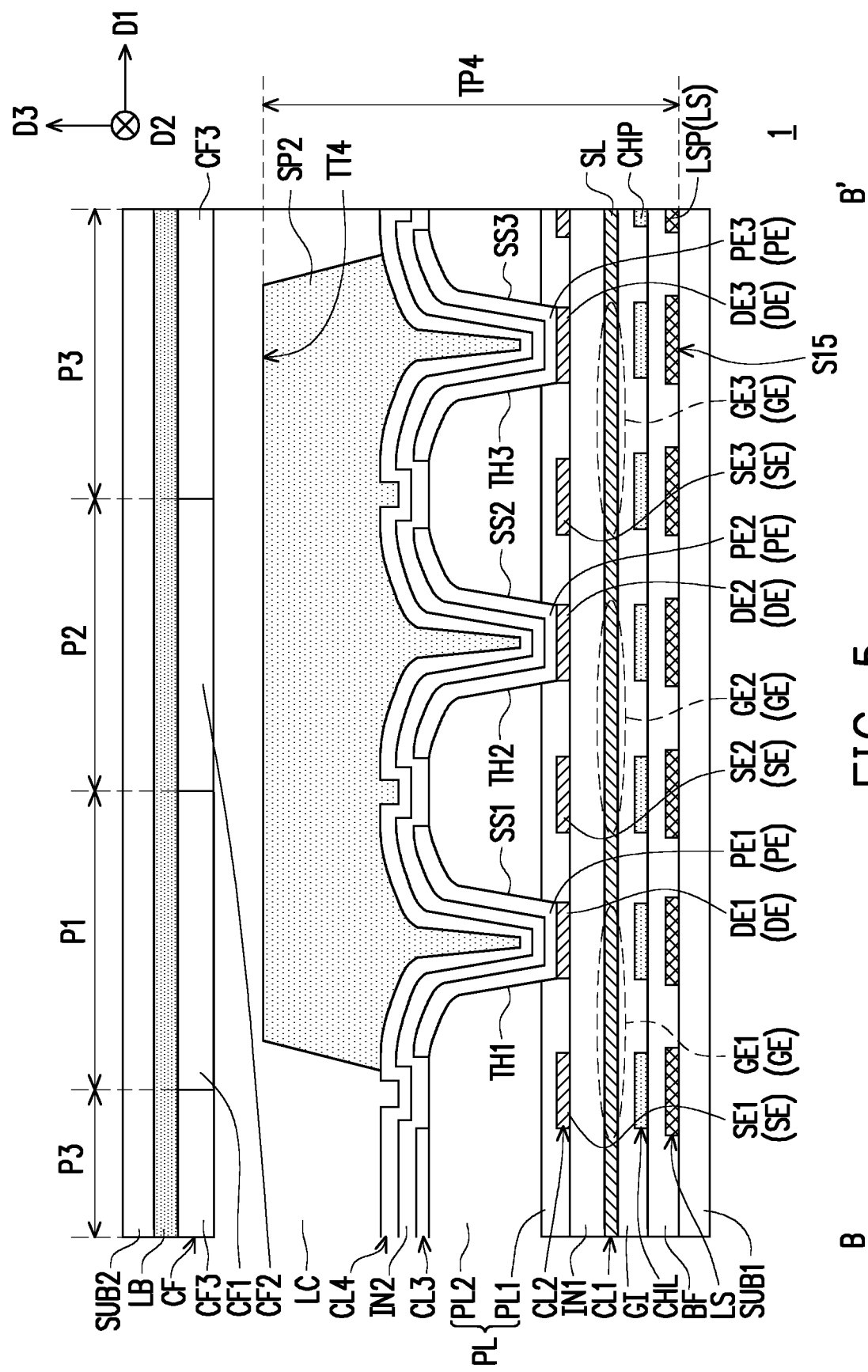

FIG. 4 and FIG. 5 are respectively second schematic cross-sectional views taken along section line A-A' and section line B-B' in FIG. 1. The main difference between FIG. 2 and FIG. 4 lies in that the spacer SP1 in FIG. 4 is disposed on the first substrate SUB1, and the spacer SP1 extends into the first contact hole TH1 and the second contact hole TH2. The main difference between FIG. 3 and FIG. 5 lies that the spacer SP2 in FIG. 5 is disposed on the first substrate SUB1, and the spacer SP2 extends into the first contact hole TH1, the second contact hole TH2, and the third contact hole TH3. With the spacer disposed on the first substrate SUB1 and extending into the contact hole, the supportability of the spacer can be further improved. The spacer SP2 and the color filter layer CF may be separated by a distance.

Referring to FIG. 2 and FIG. 3, the thicknesses of the main spacer (e.g., the spacer SP1) and the sub spacer (e.g., the spacer SP2) may be measured from the same reference layer. For example, a first thickness TP1 of the main spacer (e.g., the spacer SP1) and a second thickness TP2 of the sub spacer (e.g., the spacer SP2) may be measured from the second substrate SUB2 or a reference layer on the second substrate SUB2. Specifically, the reference layer may be the second substrate SUB2 or may be another layer on the second substrate SUB2 such as the color filter layer CF, but is not limited thereto. According to some embodiments, in FIG. 2, the first thickness TP1 of the main spacer (e.g., the spacer SP1) may be the distance from a top TT1 of the main spacer (e.g., the spacer SP1) to a surface S25 of the second substrate SUB2. In FIG. 3, the second thickness TP2 of the sub spacer (e.g., the spacer SP2) may be the distance from a top TT2 of the sub spacer (e.g., the spacer SP2) to the surface S25 of the second substrate SUB2. The first thickness TP1 may be greater than the second thickness TP2.

Referring to FIG. 4 and FIG. 5, a third thickness TP3 of the main spacer (e.g., the spacer SP1) and a fourth thickness TP4 of the sub spacer (e.g., the spacer SP2) may be measured from the first substrate SUB1 or a reference layer on the first substrate SUB1. Specifically, the reference layer may be the first substrate SUB1 or may be another layer on the first substrate SUB1 such as the inorganic material layer PL1 on the second conductive layer CL2, but is not limited thereto. According to some embodiments, in FIG. 4, the third thickness TP3 of the main spacer (e.g., the spacer SP1) may be the distance from a top TT3 of the main spacer (e.g., the spacer SP1) to a surface S15 of the first substrate SUB1. In FIG. 5, the fourth thickness TP4 of the sub spacer (e.g., the spacer SP2) may be the distance from a top TT4 of the sub spacer (e.g., the spacer SP2) to the surface S15 of the first substrate SUB1. The third thickness TP3 may be greater than the fourth thickness TP4.

Figure 6:
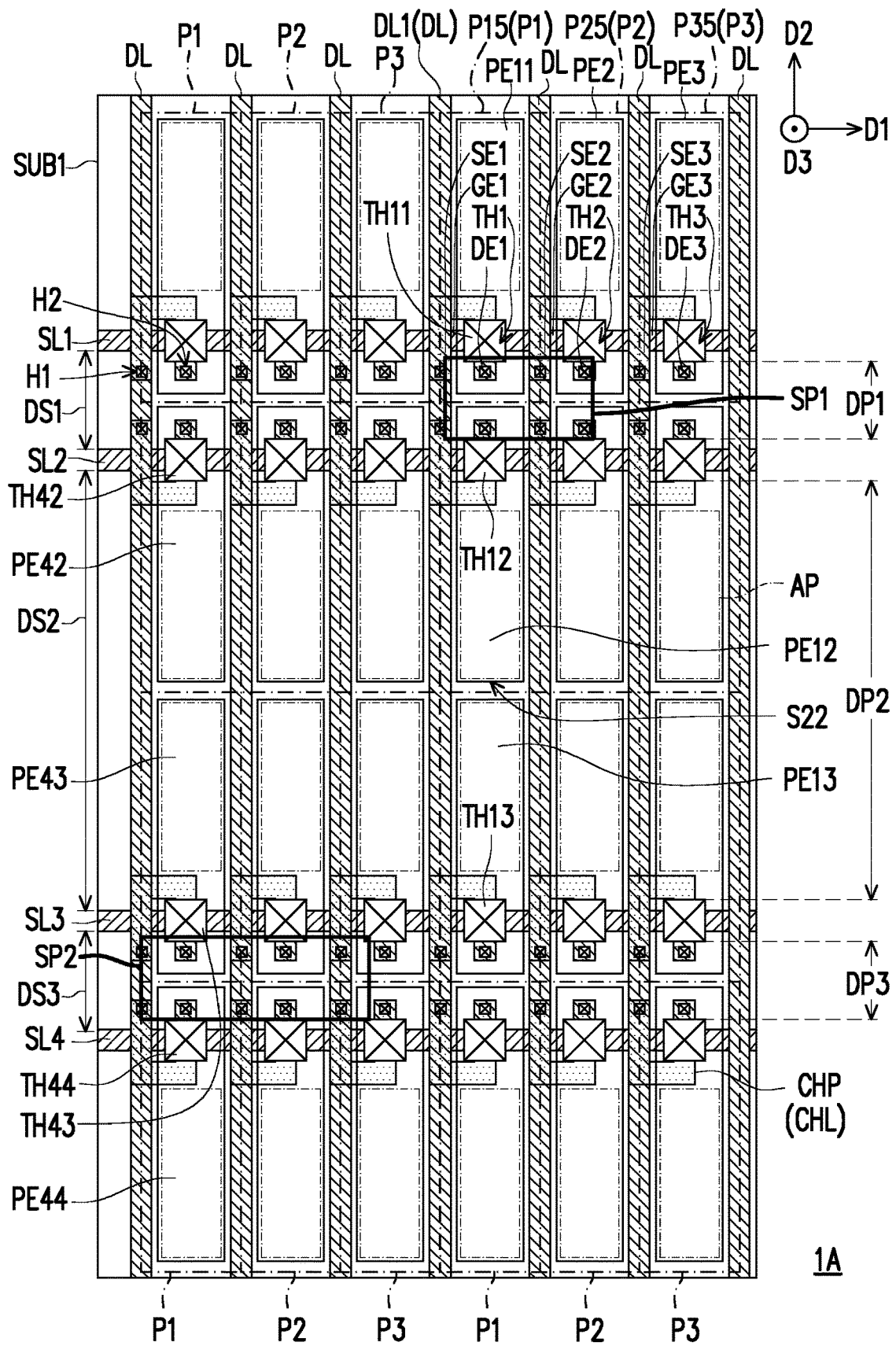
FIG. 6 is a schematic partial top view of a display device according to a second embodiment of the disclosure.

FIG. 6 is a schematic partial top view of a display device according to a second embodiment of the disclosure. Referring to FIG. 6, the main difference between a display device 1A and the display device 1 in FIG. 1 will be described below. In the display device 1A, two pixels adjacent in the second direction D2 are designed to be mirror images of each other, and each two scan lines SL are disposed closer to each other. Referring to FIG. 6, the first conductive layer CL1 includes a plurality of scan lines, for example, including a first scan line SL1, a second scan line SL2, and a third scan line SL3. The first scan line SL1, the second scan line SL2, and the third scan line SL3 may extend along the first direction D1. The first scan line SL1, the second scan line SL2, and the third scan line SL3 may be arranged along the second direction D2. The second scan line SL2 may be disposed between the first scan line SL1 and the third scan line SL3 and may be disposed adjacent to the first scan line SL1 and the third scan line SL3. The first scan line SL1 and the second scan line SL2 are disposed adjacent to each other, which means that in the second direction D2, no other scan line is present between the first scan line SL1 and the second scan line SL2. A distance DS2 between the second scan line SL2 and the third scan line SL3 is greater than a distance DS1 between the first scan line SL1 and the second scan line SL2. According to some embodiments, the distance DS2 between the second scan line SL2 and the third scan line SL3 may be 1.5 times or more the distance DS1 between the first scan line SL1 and the second scan line SL2, for example, between 1.5 times and 20 times, between 1.5 times and 5 times, between 1.5 times and 3 times, and between 2 times and 10 times.

Referring to FIG. 6, reference may be made to the design of the pixel regions in FIG. 1 for descriptions of the design of the first pixel region P1, the second pixel region P2, and the third pixel region P3. The main difference between FIG. 6 and FIG. 1 lies in the position configurations of the scan line and the contact hole. The first pixel region P1 (e.g., a first pixel region P15), the second pixel region P2 (e.g., a second pixel region P25), and the third pixel region P3 (e.g., a third pixel region P35) are disposed adjacent to each other. In other words, a first pixel electrode PE11 disposed in the first pixel region P15, a second pixel electrode PE2 disposed in the second pixel region P25, and a third pixel electrode PE3 disposed in the third pixel region P35 are disposed adjacent to each other. In the first pixel region P15, the first pixel electrode PE11 may be electrically connected to the first drain DE1 via a first contact hole TH11. In the second pixel region P25, the second pixel electrode PE2 may be electrically connected to the second drain DE2 via a second contact hole TH2. In the third pixel region P35, the third pixel electrode PE3 may be electrically connected to the third drain DE3 via a third contact hole TH3.

In the second direction D2, the first pixel electrode PE11, a first pixel electrode PE12, and a first pixel electrode PE13 are disposed adjacent to each other, and the first pixel electrode PE12 is disposed between the first pixel electrode PE11 and the first pixel electrode PE13. The first pixel electrode PE12 is electrically connected to the corresponding drain via a first contact hole TH12. The first pixel electrode PE13 is electrically connected to the corresponding drain via a first contact hole TH13. The first pixel electrode PE11, the first pixel electrode PE12, and the first pixel electrode PE13 in the same column are electrically connected to the corresponding drains respectively via the first contact hole TH11, the first contact hole TH12, and the first contact hole TH13. A distance DP1 between the first contact hole TH11 and the first contact hole TH12 is less than a distance DP2 between the first contact hole TH12 and the first contact hole TH13.

Referring to FIG. 6, at least part of the spacer is disposed between adjacent scan lines. For example, according to some embodiments, the spacer SP1 may be disposed between the first scan line SL1 and the second scan line SL2 and does not overlap with the first scan line SL1 and the second scan line SL2. According to some embodiments, the spacer SP1 may have a greater width in the second direction D2. Although not shown in the drawings, for example, the spacer SP1 may overlap with part of the first scan line SL1, may overlap with part of the second scan line SL2, or may overlap with part of the first scan line SL1 and the second scan line SL2.

Referring to FIG. 6, the first conductive layer CL1 may include a fourth scan line SL4, which may extend along the first direction D1. The third scan line SL3 may be disposed between the second scan line SL2 and the fourth scan line SL4 and may be disposed adjacent to the fourth scan line SL4. The distance DS2 between the second scan line SL2 and the third scan line SL3 is greater than a distance DS3 between the third scan line SL3 and the fourth scan line SL4. According to some embodiments, the distance DS2 between the second scan line SL2 and the third scan line SL3 may be 1.5 times or more the distance DS3 between the third scan line SL3 and the fourth scan line SL4, for example, between 1.5 times and 20 times, between 1.5 times and 5 times, between 1.5 times and 3 times, and between 2 times and 10 times.

Referring to the design of the spacer SP2 in FIG. 6, in the second direction D2, a pixel electrode PE42, a pixel electrode PE43, and a pixel electrode PE44 are disposed adjacent to each other, and the pixel electrode PE43 is disposed between the pixel electrode PE42 and the pixel electrode PE44. The pixel electrode PE42 is electrically connected to the corresponding drain via a contact hole TH42, the pixel electrode PE43 is electrically connected to the corresponding drain via a contact hole TH43, and the pixel electrode PE44 is electrically connected to the corresponding drain via a contact hole TH44. The pixel electrode PE42, the pixel electrode PE43, and the pixel electrode PE44 in the same column are electrically connected to the corresponding drains respectively via the contact hole TH42, the contact hole TH43, and the contact hole TH44. A distance DP3 between the contact hole TH43 and the contact hole TH44 is less than the distance DP2 between the contact hole TH42 and the contact hole TH43.

Referring to FIG. 6, at least part of the spacer SP2 is disposed between adjacent scan lines. For example, according to some embodiments, the spacer SP2 may be disposed between the third scan line SL3 and the fourth scan line SL4 and does not overlap with the third scan line SL3 and the fourth scan line SL4. According to some embodiments, the spacer SP2 may have a greater width in the second direction D2. Although not shown in the drawings, for example, another part of the spacer SP2 may overlap with part of the third scan line SL3, may overlap with part of the fourth scan line SL4, or may overlap with part of the third scan line SL3 and the fourth scan line SL4.

Compared with the configuration in FIG. 1, according to the configuration of the spacer SP1 in FIG. 6, since the distance DS2 between the second scan line SL2 and the third scan line SL3 is greater than the distance DS1 between the first scan line SL1 and the second scan line SL2, and at least part of the spacer SP1 is disposed between the first scan line SL1 and the second scan line SL2, the supportability of the spacer can be further improved. According to the configuration of the spacer SP2 in FIG. 6, since the distance DS2 between the second scan line SL2 and the third scan line SL3 is greater than the distance DS3 between the third scan line SL3 and the fourth scan line SL4, and at least part of the spacer SP2 is disposed between the third scan line SL3 and the fourth scan line SL4, the supportability of the spacer can be further improved. According to some embodiments, it is possible not to dispose the light barrier layer LB on a side away from the contact hole. For example, it is possible not to dispose the light barrier layer LB on a side S22 of the pixel electrode PE12 in FIG. 6. Accordingly, the shielding ratio of the pixel can be reduced, and the aperture ratio of the display device can be increased.

In summary of the above, in the embodiments of the disclosure, by designing the spacer and the contact hole to at least partially overlap with each other, the contact area between the spacer and other components or layers can be increased, thereby improving the supportability of the spacer.

Finally, it should be noted that the foregoing embodiments are merely used for describing the technical solutions of the disclosure, but are not intended to limit the disclosure. Although the disclosure has been described in detail with reference to the foregoing embodiments, a person of ordinary skill in the art should understand that modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the disclosure.

Although the embodiments of the disclosure and their advantages have been disclosed above, it should be understood that any person of ordinary skill in the art may make changes, replacements, and modifications without departing from the spirit and scope of the disclosure. In addition, the features between the embodiments may be mixed and replaced to form other new embodiments. Moreover, the protection scope of the disclosure is not limited to the manufacturing processes, machines, productions, material compositions, devices, methods, and steps in the specific embodiments described in the specification. Based on the contents of the disclosure, any person of ordinary skill in the art may understand the current or future manufacturing processes, machines, productions, material compositions, devices, methods, and steps, which may be applied according to the disclosure as long as they can implement substantially the same functions or obtain substantially the same results in the embodiments described herein. Therefore, the protection scope of the disclosure includes the above-mentioned manufacturing processes, machines, productions, material compositions, devices, methods, and steps. In addition, each claim forms an individual embodiment, and the protection scope of the disclosure also includes the combination of each claim and embodiment. The protection scope of the disclosure shall be determined by the appended claims.

What is claimed is:

1. A display device comprising:
a first substrate;
a first drain and a second drain disposed on the first substrate;
a planarization layer disposed on the first drain, having a first contact hole exposing the first drain;
a first pixel electrode disposed on the planarization layer and electrically connected to the first drain via the first contact hole;
a second substrate disposed opposite to the first substrate;
a first spacer disposed on the first substrate and between the planarization layer and the second substrate, wherein the first spacer extends into the first contact hole and partially overlaps with the first contact hole;
a common electrode layer disposed on the planarization layer, wherein the first spacer is directly in contact with the common electrode layer or directly in contact with the first pixel electrode;
a first scan line, a second scan line, and a third scan line disposed on the first substrate and extending along a first direction, wherein the second scan line is disposed between the first scan line and the third scan line and is disposed adjacent to the first scan line and the third scan line,
wherein a distance between the second scan line and the third scan line is greater than a distance between the first scan line and the second scan line, wherein at least part of the first spacer is disposed between the first scan line and the second scan line,
a first gate disposed in a first pixel region and electrically connected to the first scan line;

a second gate disposed in a second pixel region and electrically connected to the first scan line, wherein the first pixel region is adjacent to the second pixel region along the first direction, wherein the first drain is connected to a first semiconductor pattern via a second opening, the second drain is connected to a second semiconductor pattern via another second opening, and the first spacer partially overlaps with the second opening and the another second opening;

a first data line and a second data line disposed on the first substrate, wherein the first data line comprises a first source and a third source, the second data line comprises a second source, the first source is electrically connected to the first semiconductor pattern via a first opening, the second source is electrically connected to the second semiconductor pattern via another first opening, the third source is electrically connected to a third semiconductor pattern via a further first opening, the first scan line overlaps with the first semiconductor pattern and the second semiconductor pattern, and the line overlaps with the third semiconductor pattern; and a third drain disposed on the first substrate and electrically connected to the third semiconductor pattern via a further second opening, wherein in a top view of the display device, the second opening and the further second opening are disposed between the first data line and the second data line, the second opening and the further second opening are disposed between the first scan line and the second scan line, and the first spacer is overlapped with the second opening and the further second opening.

2. The display device according to claim 1, wherein the first spacer at least partially overlaps with the first scan line.

3. The display device according to claim 1, further comprising:

a light barrier layer disposed on the second substrate and between the first spacer and the second substrate and comprising a plurality of apertures, wherein the plurality of apertures are arranged in the first direction and a second direction, the second direction intersects with the first direction, and the first spacer is disposed between two adjacent apertures arranged in the second direction.

4. The display device according to claim 1, further comprising a second spacer, wherein the planarization layer has another contact hole exposing another drain, the second spacer extends into the another contact hole and partially overlaps with the another contact hole, wherein a width of the second spacer in a first direction is greater than a width of the first spacer in the first direction.

5. The display device according to claim 4, wherein a shape of an orthographic projection of the first spacer on the first substrate is rectangular, and a shape of an orthographic projection of the second spacer on the first substrate is rectangular.

6. The display device according to claim 4, wherein the second spacer is a sub spacer, and the first spacer is a main spacer.

7. The display device according to claim 4, further comprising:

a fourth scan line disposed on the first substrate, wherein the third scan line is disposed between the second scan line and the fourth scan line and is disposed adjacent to the second scan line and the fourth scan line, the distance between the second scan line and the third scan line is greater than a distance between the third scan line and the fourth scan line, and at least part of the second spacer is disposed between the third scan line and the fourth scan line.

8. The display device according to claim 4, wherein the first spacer and the second spacer have a same width in a second direction, and the first direction and the second direction are perpendicular.

9. The display device according to claim 1, wherein the first spacer does not overlap with the first scan line and the second scan line.

10. The display device according to claim 1, wherein there is no spacer between the second scan line and the third scan line along a second direction, and the second direction intersects with the first direction.

11. The display device according to claim 1, further comprising:

a first source connected to a first semiconductor pattern via a first opening;

wherein the first drain is connected to the first semiconductor pattern via a second opening, and wherein the first spacer partially overlaps with the first opening and partially overlaps with the second opening.

12. The display device according to claim 1, wherein the first spacer is directly in contact with the common electrode layer, and the first spacer is not directly in contact with the first pixel electrode.

13. The display device according to claim 1, wherein the first spacer is directly in contact with the first pixel electrode, and the first spacer is not directly in contact with the common electrode layer.

* * * * *